US009298400B2

(12) United States Patent
Nishiyama et al.

(10) Patent No.: US 9,298,400 B2
(45) Date of Patent: Mar. 29, 2016

(54) COMMUNICATION SYSTEM, IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventors: Masashi Nishiyama, Tokyo (JP); Yoshimasa Kawana, Tokyo (JP); Yuki Ito, Kawasaki (JP); Daiki Tachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/690,301

(22) Filed: Apr. 17, 2015

(65) Prior Publication Data

US 2015/0301765 A1    Oct. 22, 2015

(30) Foreign Application Priority Data

Apr. 21, 2014    (JP) .................................. 2014-087466

(51) Int. Cl.
G06F 3/12        (2006.01)
G06F 11/07       (2006.01)
G06K 15/00       (2006.01)

(52) U.S. Cl.
CPC ............ *G06F 3/1203* (2013.01); *G06F 3/1224* (2013.01); *G06F 3/1285* (2013.01); *G06F 11/0733* (2013.01); *G06F 11/0748* (2013.01); *G06F 11/0793* (2013.01)

(58) Field of Classification Search
None
See application file for complete search history.

(56) References Cited

U.S. PATENT DOCUMENTS

| 2004/0201867 | A1  | 10/2004 | Katano |
| 2007/0285689 | A1  | 12/2007 | Hozumi |
| 2009/0165005 | A1  | 6/2009  | Hagiuda |
| 2012/0293837 | A1* | 11/2012 | Mori .................. H04N 1/00464 358/1.15 |
| 2013/0055035 | A1* | 2/2013  | Nakatsu .............. G06F 11/0733 714/48 |

FOREIGN PATENT DOCUMENTS

| EP | 2196898 A1    | 6/2010 |
| EP | 2549373 A2    | 1/2013 |
| JP | 2005-208974 A | 8/2005 |
| WO | 20071127905 A2 | 11/2007 |

* cited by examiner

*Primary Examiner* — Dov Popovici
(74) *Attorney, Agent, or Firm* — Canon USA Inc. IP Division

(57) ABSTRACT

A communication system includes an image processing apparatus, a supporting apparatus capable of providing the remote support service to a user of the image processing apparatus, and a management server configured to associate the image processing apparatus with the supporting apparatus providing the remote support to the image processing apparatus to manage the image processing apparatus and the supporting apparatus. Upon receipt of the remote support service start request from the user, the image processing apparatus requests a relay server to allocate relay information for communication via the relay server, and notifies the management server of the relay information allocated by the relay server. The management server notifies the supporting apparatus managed in association with the image processing apparatus of the relay information. Using the relay information enables the image processing apparatus and the supporting apparatus to communicate with each other to provide the remote support via the relay server.

10 Claims, 18 Drawing Sheets

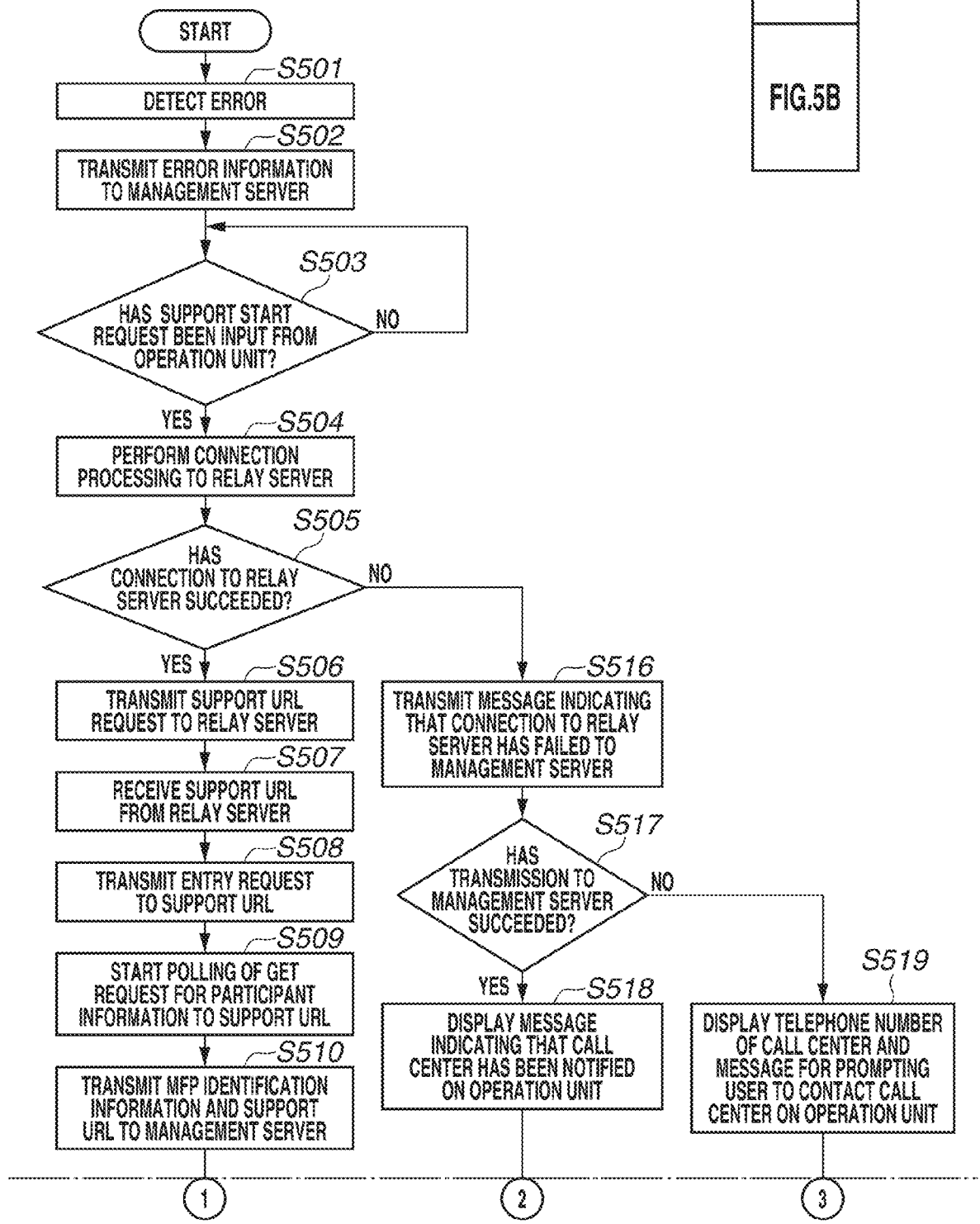

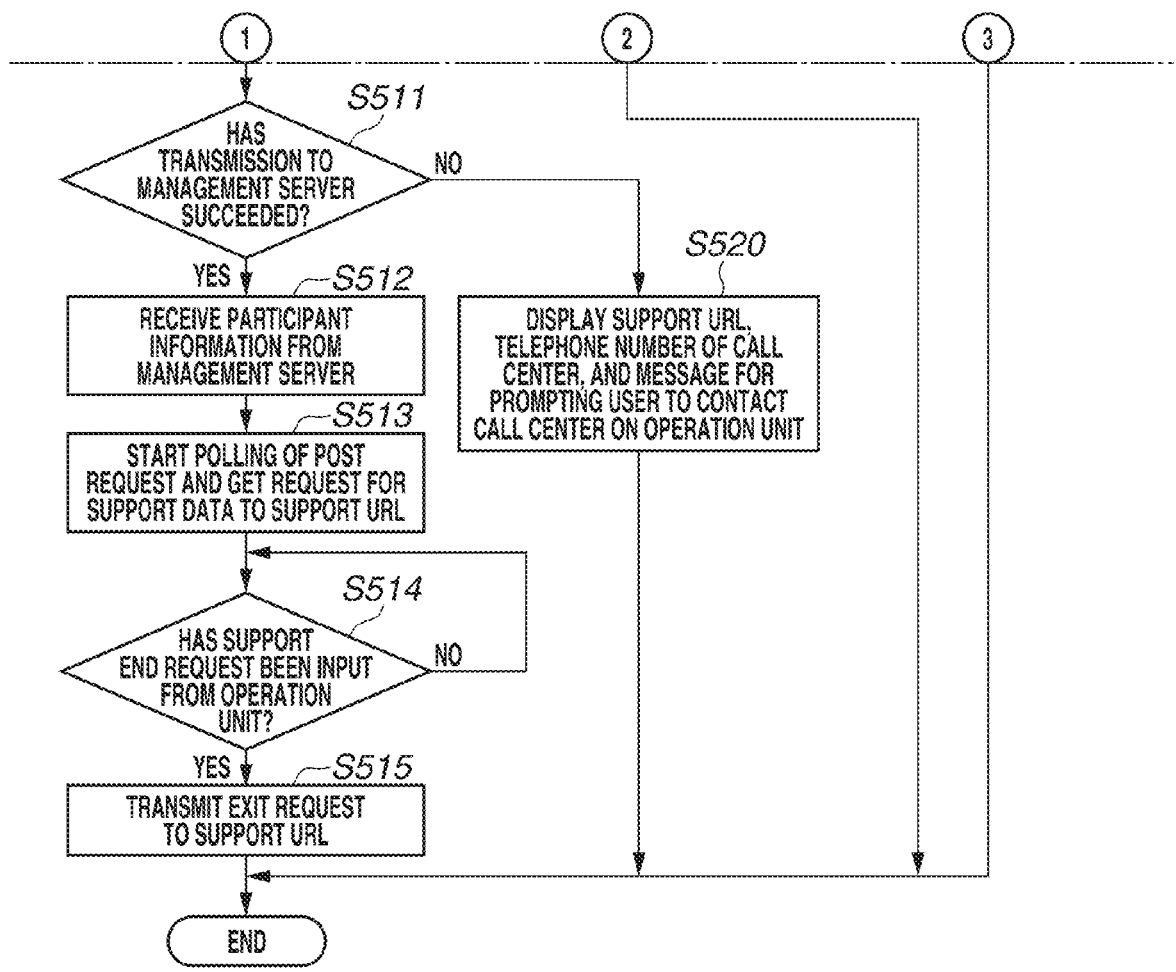

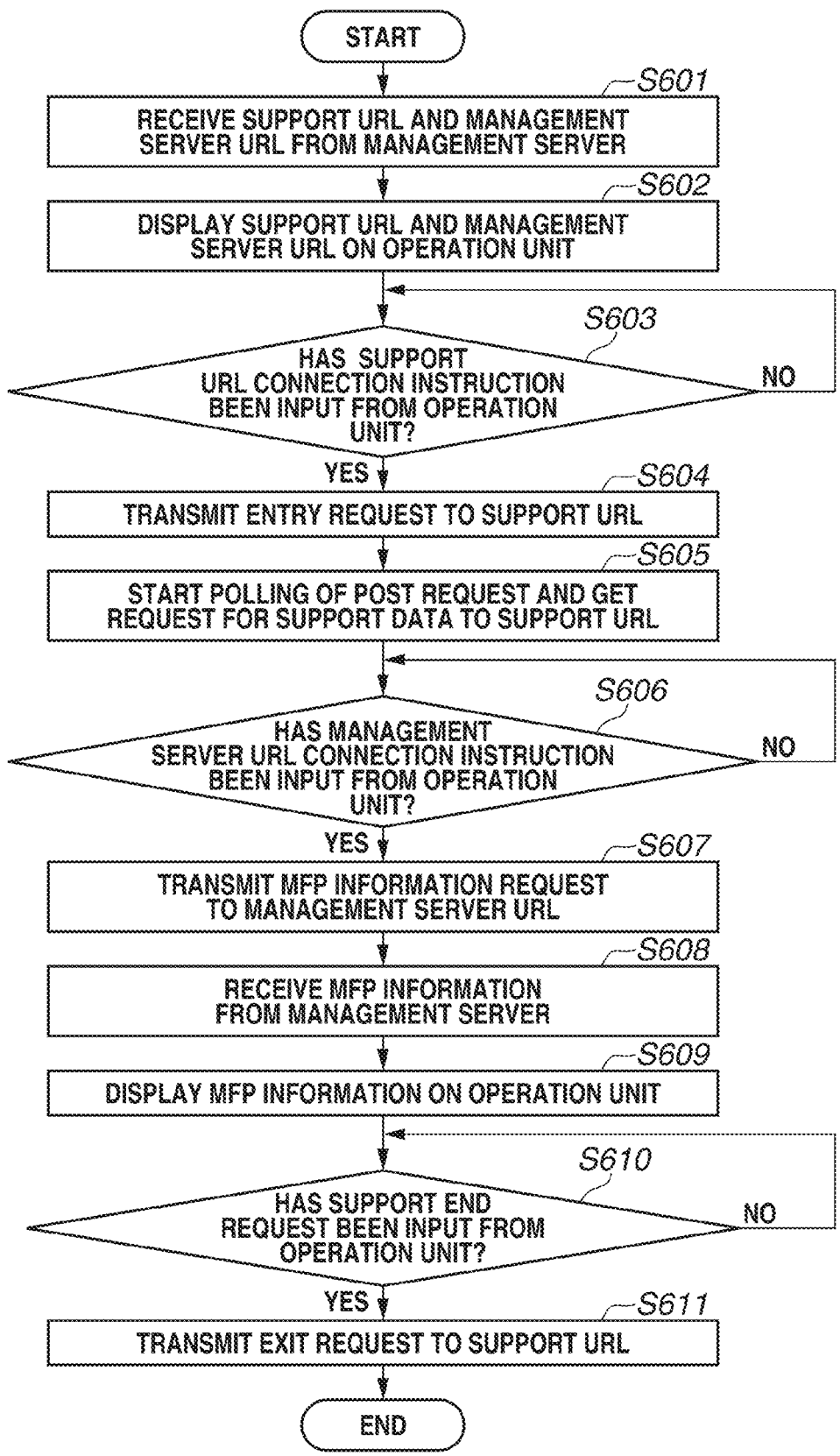

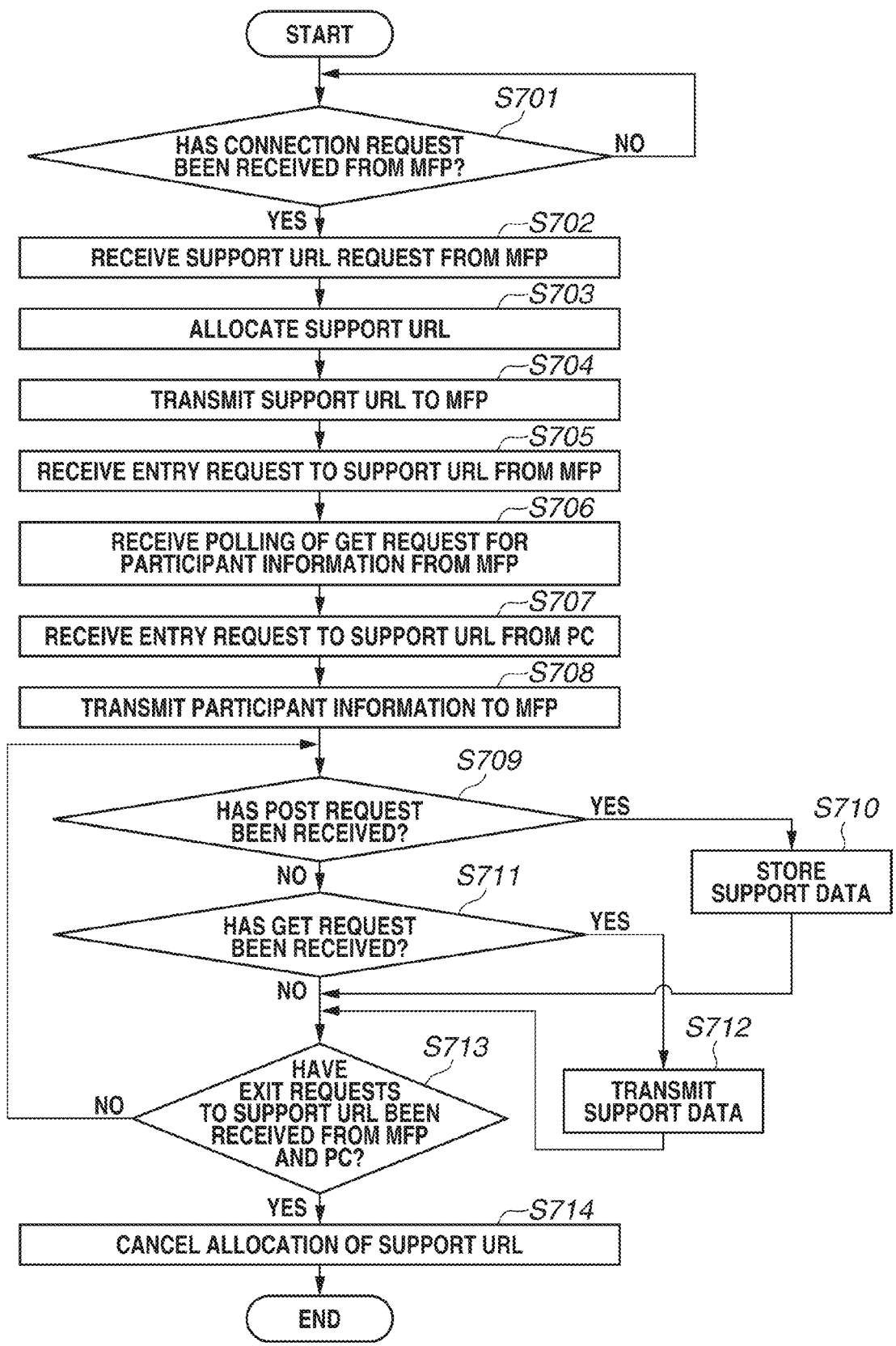

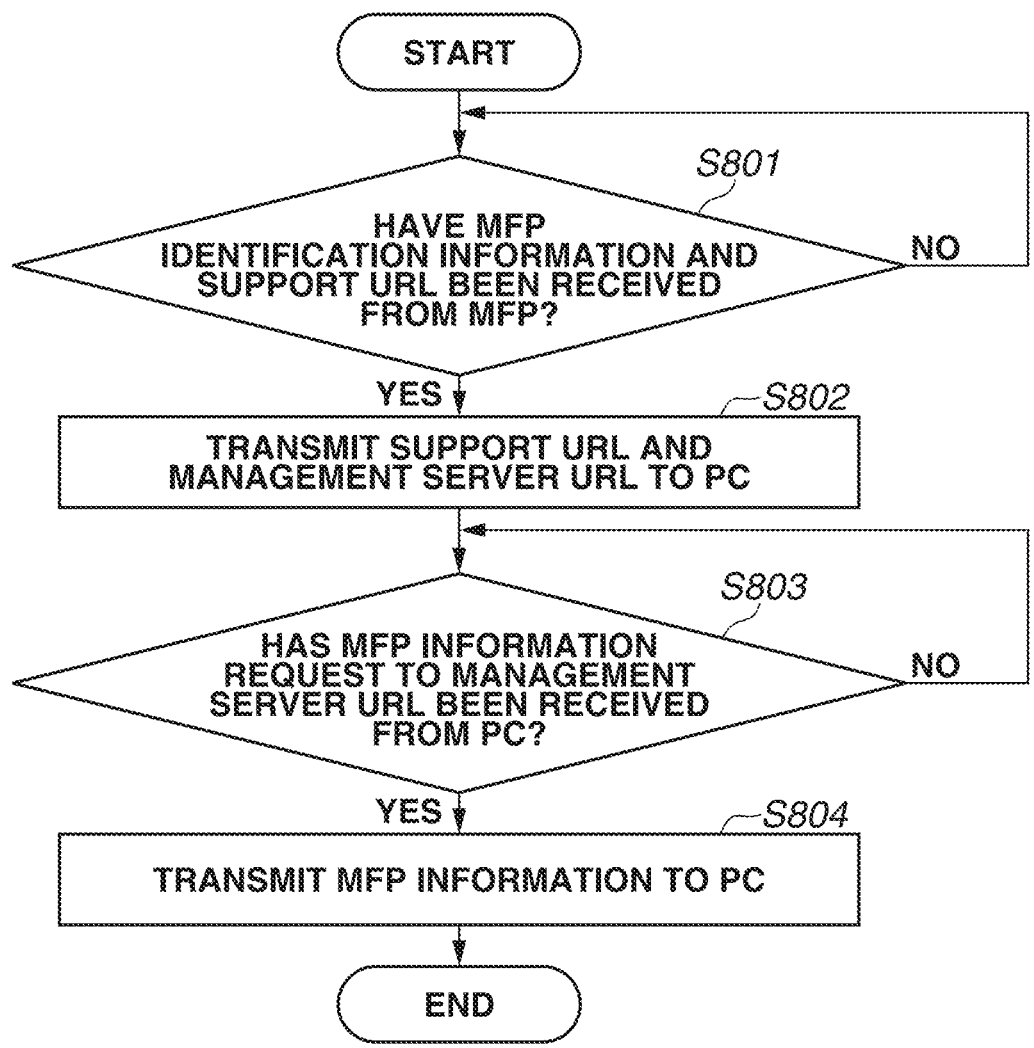

FIG.10A

1001 < Remote Operator Connection Service >

| | | |
|---|---|---|
| 1002 | Operator Service | ON |
| 1003 | Server Port | 443 |
| 1004 | Server Address | https://Operation_Service.com/device-if |
| 1005 | Communication Test | |
| 1006 | Communication Log | |
| 1007 | Operator Email Addr. | operator@supportcenter.com |

FIG.10B

1011 < Remote Monitoring Service >

| | | |
|---|---|---|
| 1012 | Monitoring Service | ON |
| 1013 | Server Port | 443 |
| 1014 | Server Address | https://Monitoring_Service.com/device-if |
| 1015 | Communication Test | |
| 1016 | Communication Log | |

FIG.12

< SERVICE OPERATOR SUPPORT REQUEST >

· NOTIFICATION DESTINATION INFORMATION http://Operation_Sevice.com/device-if/?rn=1827346cceff?ct=23765ec?sn=776235aba

× CANCEL

ISSUE SUPPORT REQUEST

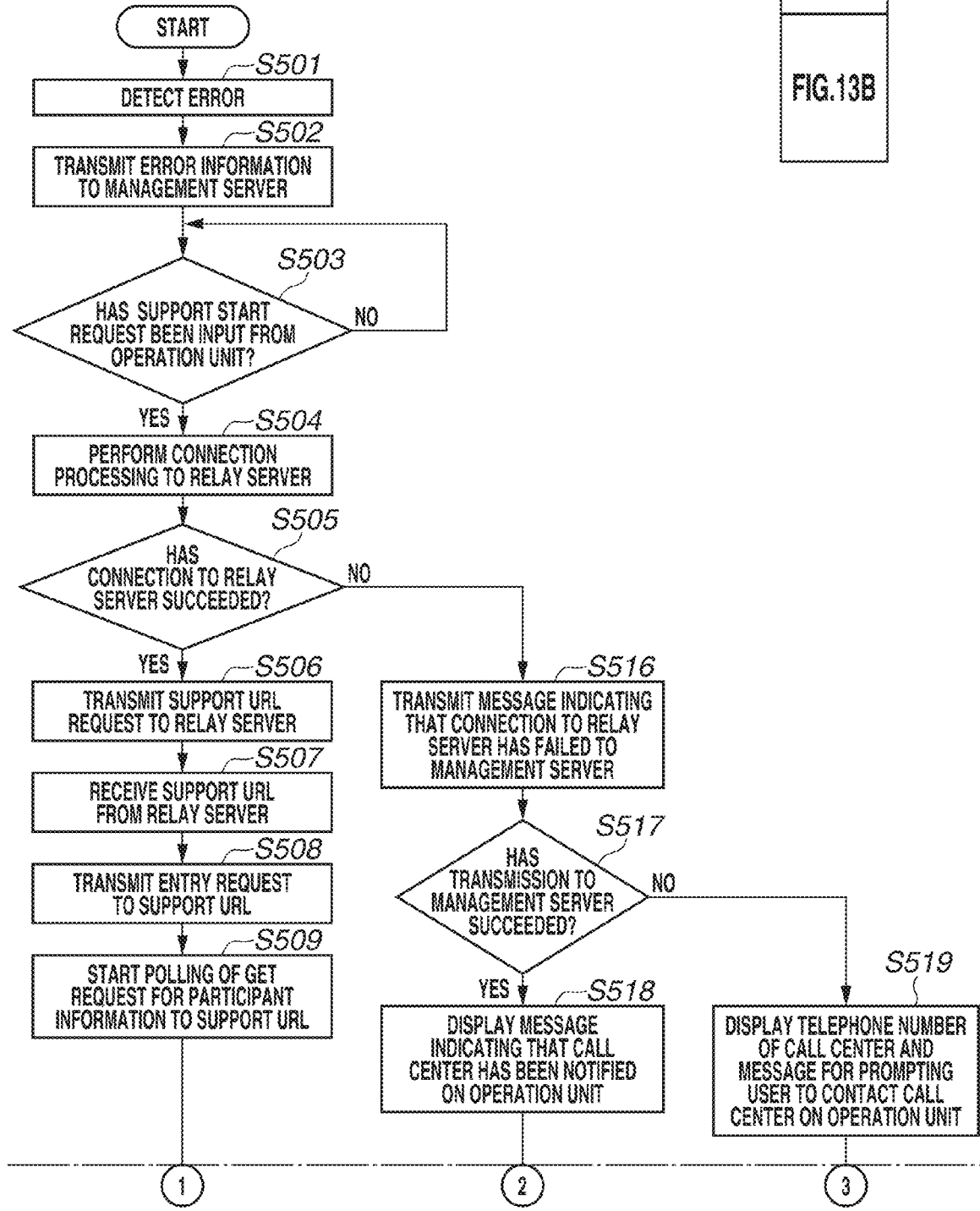

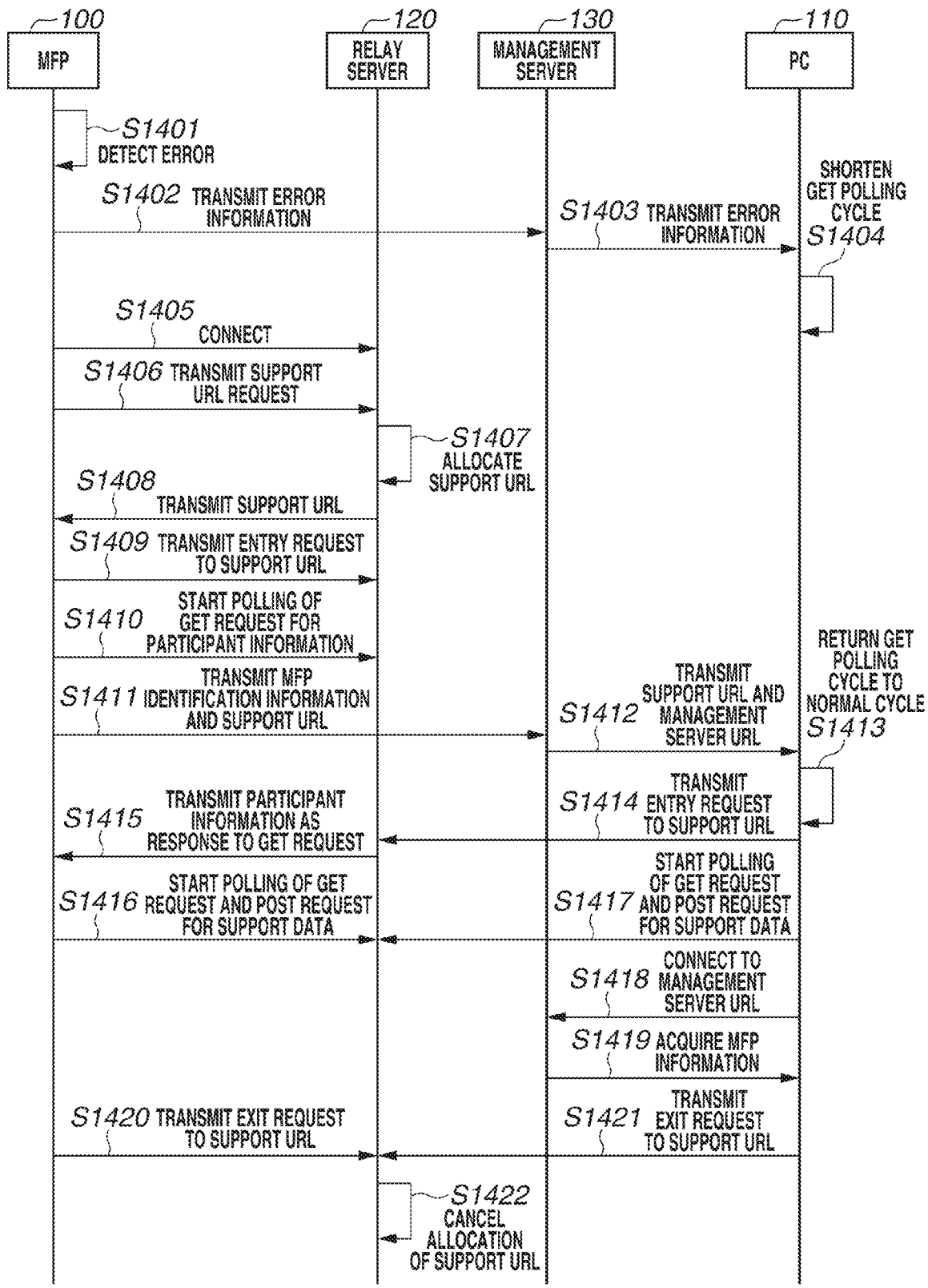

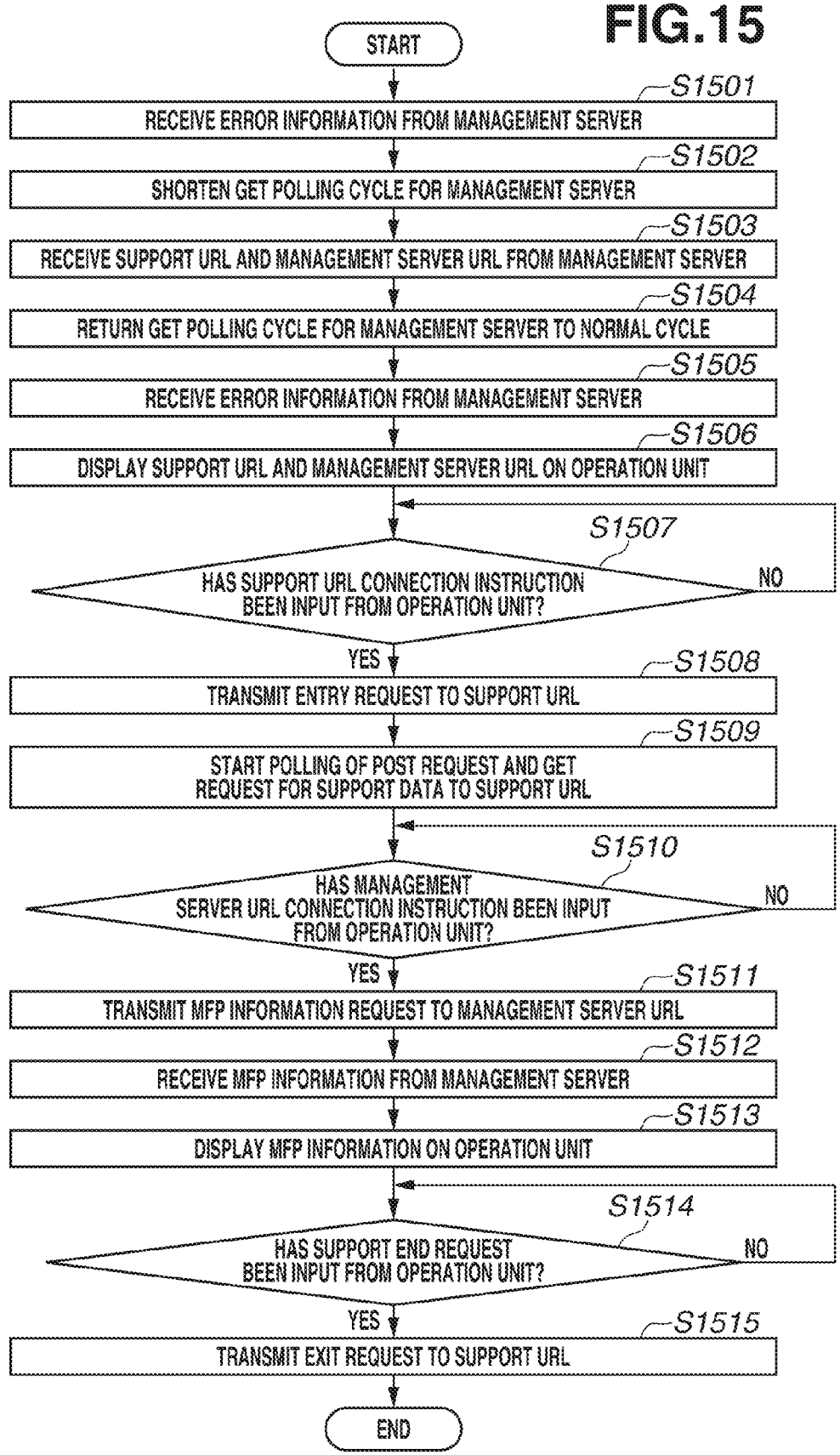

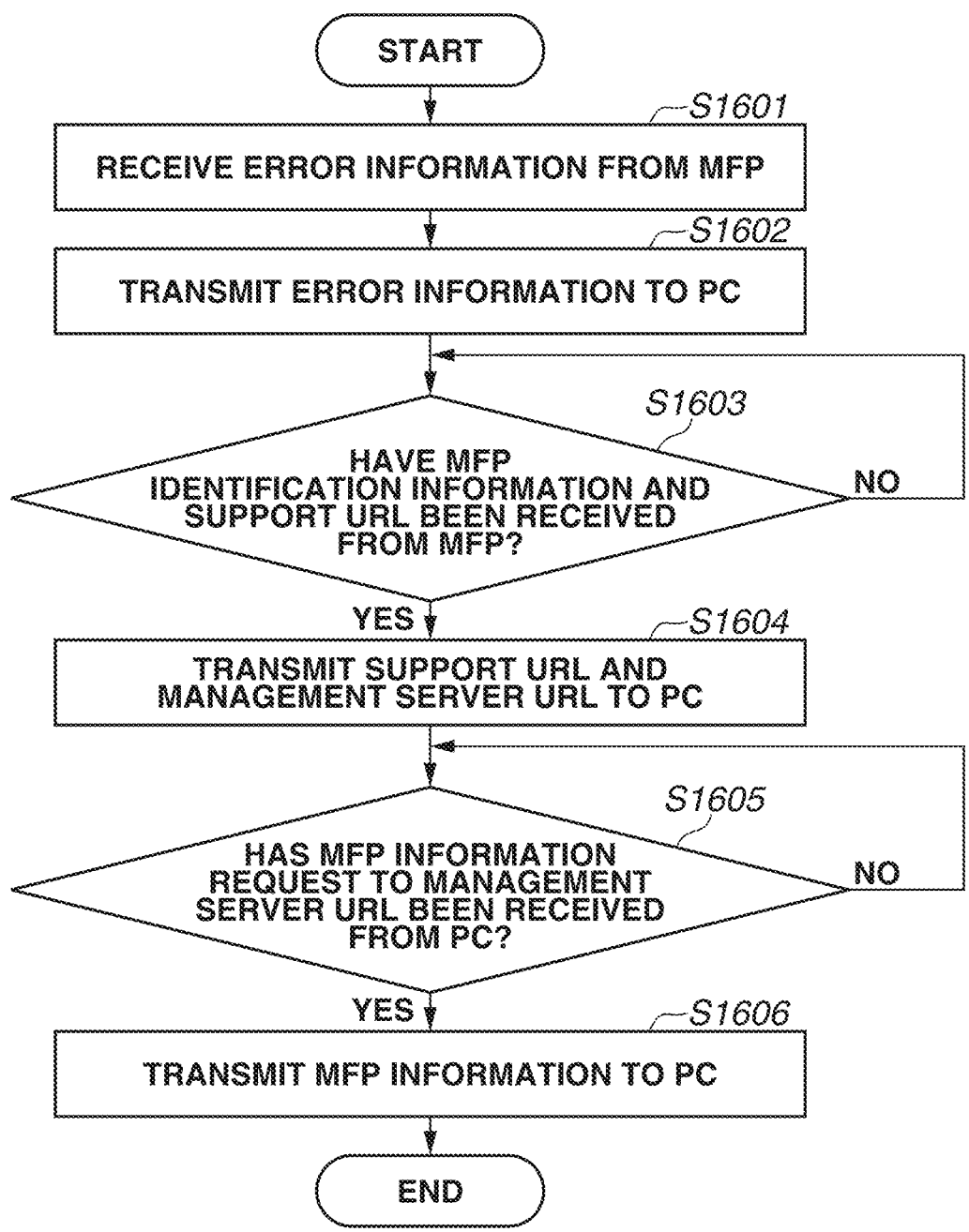

COMMUNICATION SYSTEM, IMAGE PROCESSING APPARATUS, CONTROL METHOD FOR IMAGE PROCESSING APPARATUS, AND STORAGE MEDIUM

BACKGROUND OF THE INVENTION

1. Field of the Invention

The present invention relates to a communication system, an image processing apparatus, a control method for the image processing apparatus, and a storage medium.

2. Description of the Related Art

As troubleshooting of electrical products such as personal computers (PCs) and home electric appliances becomes more complicated, more users ask questions directly to call centers of sales companies or manufactures.

As for an image forming apparatus, Japanese Patent Application Laid-Open No. 2005-208974 discusses remote support (remote maintenance) service performed using audio and moving image communication, and remote control.

In the remote support service, the image forming apparatus that receives the support and a PC of a call center that provides the support are generally inside a firewall. Since the firewall is configured to reject connection of a terminal outside thereof to a terminal inside thereof, a PC of a remote call center cannot be connected to the image forming apparatus.

Moreover, since a call center is generally run by each sales company selling image forming apparatuses, each image forming apparatus needs to receive remote support service from an appropriate call center that is run by the corresponding sales company. More specifically, if a user performs a remote support service start operation in the image forming apparatus, the user needs to notify the appropriate call center accordingly.

SUMMARY OF THE INVENTION

The present invention is directed to a technique capable of providing remote support service to an image processing apparatus by performing a simple operation.

According to an aspect of the present invention, a communication system includes an image processing apparatus, a supporting apparatus capable of providing remote support to the image processing apparatus, and a management server configured to associate the image processing apparatus with the supporting apparatus for providing the remote support to the image processing apparatus to manage the image processing apparatus and the supporting apparatus. The image processing apparatus includes a receiving unit configured to receive a remote support service start request from a user, a request unit configured to, if the remote support service start request is received by the receiving unit, request a relay server to allocate relay information for communication via the relay server, and a first notification unit configured to notify the management server of the relay information allocated by the relay server in response to the request from the request unit. The management server includes a second notification unit configured to notify the supporting apparatus managed in association with the image processing apparatus of the relay information notified by the first notification unit. The image processing apparatus and the supporting apparatus communicate with each other via the relay server by using the relay information, so that the supporting apparatus provides remote support to the image processing apparatus.

Further features of the present invention will become apparent from the following description of exemplary embodiments with reference to the attached drawings.

BRIEF DESCRIPTION OF THE DRAWINGS

FIG. 5 (consisting of FIGS. 5A and 5B) is a flowchart illustrating an example of processing performed by the MFP according to the first exemplary embodiment.

FIG. 6 is a flowchart illustrating an example of processing performed by the PC according to the first exemplary embodiment.

FIG. 7 is a flowchart illustrating an example of processing performed by the relay server according to the first exemplary embodiment.

FIG. 8 is a flowchart illustrating an example of processing performed by the management server according to the first exemplary embodiment.

FIGS. 10A and 10B are diagrams each illustrating an example of a setting screen of an MFP according to a second exemplary embodiment.

FIG. 12 is a diagram illustrating an example of a support uniform resource locator (URL) display screen of the MFP according to the second exemplary embodiment.

FIG. 14 is a sequence diagram illustrating an example of processing performed by an MFP, a PC, a relay server, and a management server according to a third exemplary embodiment.

FIG. 15 is a flowchart illustrating an example of processing performed by the PC according to the third exemplary embodiment.

FIG. 16 is a flowchart illustrating an example of processing performed by the management server according to the third exemplary embodiment.

DESCRIPTION OF THE EMBODIMENTS

Exemplary embodiments of the present invention will be described below with reference to the drawings.

Figure 1:
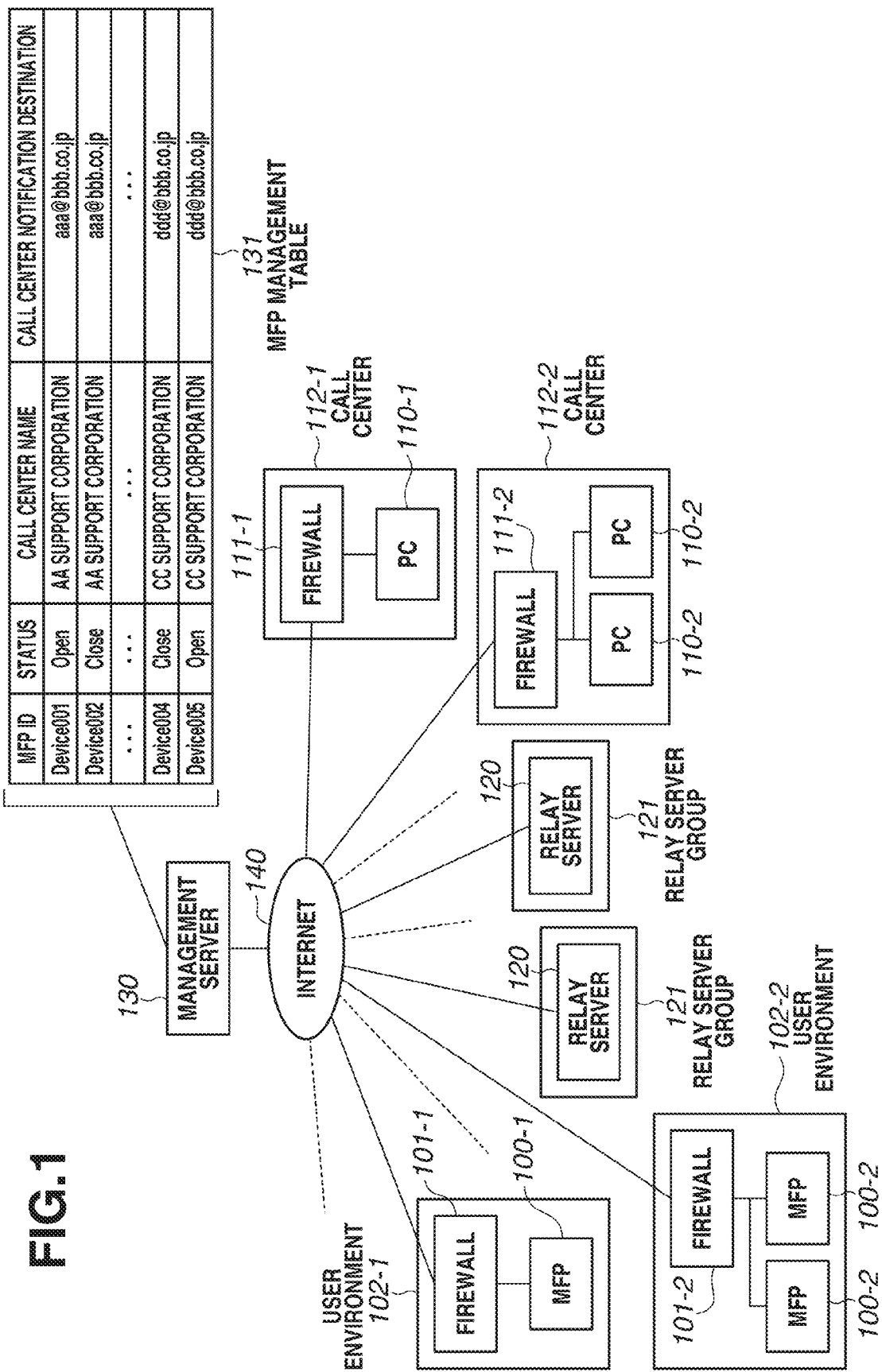
FIG. 1 is a diagram illustrating an example of a system configuration of a communication system for providing remote support service.

FIG. 1 is a diagram illustrating an example of a system configuration of a communication system capable of providing secure remote support service via a network.

A multifunctional peripheral (MFP) 100, serving as an image forming apparatus, is placed in a user environment 102 and operated by a user. The MFP 100 can access Internet 140. The image forming apparatus is an example of an information processing apparatus.

A PC 110 is placed in a call center 112. The call center 112 is operated by an operator. The PC 110 is an example of the information processing apparatus. The call center 112 is run by each sales company of the MFP 100.

Assume that there is a plurality of user environments 102, call centers 112, MFPs 100, and PCs 110. In the example diagram illustrated in FIG. 1, an MFP 100-1 in a user environment 102-1 operated and maintained by a call center 112-1, and receives remote support from a PC 110-1. Similarly, an MFP 100-2 in a user environment 102-2 operated and maintained by a call center 112-2, and receives remote support from a PC 110-2. In FIG. 1, the MFPs 100 are placed in the user environments 102. Alternatively, other information processing apparatuses, for example, PCs, server apparatuses, and tablet terminals, may be placed in the user environment 102.

A firewall 101 is constructed in the user environment 102. A firewall 111 is constructed in the call center 112. The firewall 101 permits a terminal inside the user environment 102 to be connected to the Internet 140 using a hypertext transfer protocol (HTTP). On the other hand, the firewall 101 rejects all connections from the Internet 140 side to terminals inside the user environment 102. The firewall 111 permits a terminal inside the call center 112 to be connected to the Internet 140 using the HTTP, but rejects all connections from the Internet 140 to terminals inside the call center 112.

A relay server group 121 is a group of server computers for providing service via the Internet 140. The relay server group 121 may include one server computer or a plurality of server computers. In FIG. 1, the relay server group 121 includes one relay server apparatus (hereinafter called a relay server) 120. The relay server 120 is an example of the information processing apparatus.

Each of the MFP 100 and the PC 110 has an HTTP client function, whereas the relay server 120 has an HTTP server function. The HTTP is a client/server protocol that is defined by a request for comment (RFC), for example by RFC 2616. The HTTP includes a plurality of methods. Generally, when a client receives information from a server, a GET method is used. When the client transmits information to the server, a POST method is used. In a first exemplary embodiment, the use of the GET method and the POST method enables the MFP 100 and the PC 110 to communicate with each other. More specifically, when data such as a moving image, audio, and remote control information is transmitted from the PC 110 to the MFP 100, the PC 110 first transmits a POST request for data to the relay server 120. Accordingly, the relay server 120 buffers such data in a random access memory (RAM) 313. Subsequently, when the MFP 100 transmits a GET request to the relay server 120, the relay server 120 transmits the data buffered in the RAM 313 to the MFP 100 as a response. On the other hand, when data is transmitted from the MFP 100 to the PC 110, the MFP 100 transmits a POST request for data to the relay server 120. Accordingly, the relay server 120 buffers such data in the RAM 313. Subsequently, when the PC 110 transmits a GET request to the relay server 120, the relay server 120 transmits the data buffered in the RAM 313 to the PC 110 as a response. This enables the user of the MFP 100 to receive support from an operator by using audio, moving image communication, or remote control even in the environment having the firewalls 101 and 111. In the present exemplary embodiment, various data is transmitted and received between the PC 110 and the MFP 100, so that the operator of the PC 110 can support the user of the MFP 100. Such various data is called "support data".

Here, if the MFP 100 and the PC 110 transmit POST requests and GET requests to the relay server 120, a common URL needs to be designated. Such a URL is called "a support URL". The support URL serves as relay information needed for the MFP 100 and the PC 110 to communicate with each other via the relay server 120.

The support URL needs to be common between the support target MFP 100 and the PC 110 which provides the support. Thus, before the support data communication is started, the MFP 100 and the PC 110 need to have the common support URL. For example, if remote support for the MFP 100-1 is provided from the call center 112-2, a support URL needs to be shared in advance between the MFP 100-1 and the PC 110-1. This support URL must be different from a support URL used for communication between the MFP 100-2 and the PC 110-2. Moreover, since the number of support URLs which can be allocated by the relay server 120 is limited, a support URL is desirably allocated each time the MFP 100 needs support, instead of setting a fixed support URL to the MFP 100 and the PC 110 beforehand.

For example, the support URL is expressed as follows: http://xxxcallcenter.com;
jsessionid=xxxxxxxxxxxxxxxx?type=1 In this support URL, ";jsessionid" is session information used when the server identifies a client. Further, "type" is connection type information, and indicates a type of binary transfer or American Standard Code for Information Interchange (ASCII) transfer. Moreover, the "type" can be used to define a parameter of a request number. For example, a URL that can identify a connection with the MFP 100 may be issued. In this case, if the PC 110 is connected to such a URL, the MFP 100 can be selected as a communication partner of the PC 110.

Accordingly, the present exemplary embodiment is described using an example case in which a management server 130 is used so that a support URL allocated by the relay server 120 is shared in advance between the MFP 100 and the PC 110 when support needs to be provided.

The management server 130 is located on the Internet 140 to collect and manage information of the MFPs 100 placed in the respective user environments 102. The MFP 100 includes a module that monitors a status of the MFP 100. The monitoring module notifies the management server 130 of the status of the MFP 100 at predetermined timing. The management server 130 communicates with the monitoring module inside the MFP 100, thereby monitoring the information of each of the MFPs 100. Such information of the MFPs 100 collected by the management server 130 is called management information. The management information includes, for example, operation information such as a counter value, an operation log, and a parts-counter value indicating consumption of each of parts, and failure information such as a hardware failure and a jam.

Moreover, the management server 130 manages which MFP 100 is operated and maintained by which call center 112. In other words, the management server 130 manages each of the MFPs 100 by monitoring which MFP 100 is operated and maintained by which sales company. An MFP management table 131 is information indicating a correspondence relationship between the MFP 100 and the call center 112, and is retained by the management server 130. With the MFP management table 131, a usage state of each MFP 100 and emergency contact information for each MFP 100 in case of failure can be provided to the appropriate call center 112. More specifically, when an operator of the management server 130 logs in to the management server 130, the management information collected from a monitoring target MFP 100 is displayed on a display unit. This enables the operator to monitor a state of the MFP 100. Moreover, information with a high level of urgency such as information of a service call error and a hardware failure is transmitted by electronic mail (email) to a notification destination indicated in the MFP management table 131, so that the corresponding call center 112 is notified accordingly. The MFP management table 131 will be described in detail with reference to FIG. 9.

In the present exemplary embodiment, the support URL allocated when the MFP 100 is connected to the relay server 120 is notified to the management server 130 as event information. The management server 130 notifies the PC 110 in the call center 112 operating and maintaining the MFP 100 of the support URL by using the MFP management table 131. Therefore, the support URL is shared between the support target MFP 100 and the PC 110 which provides the support.

Figure 2:
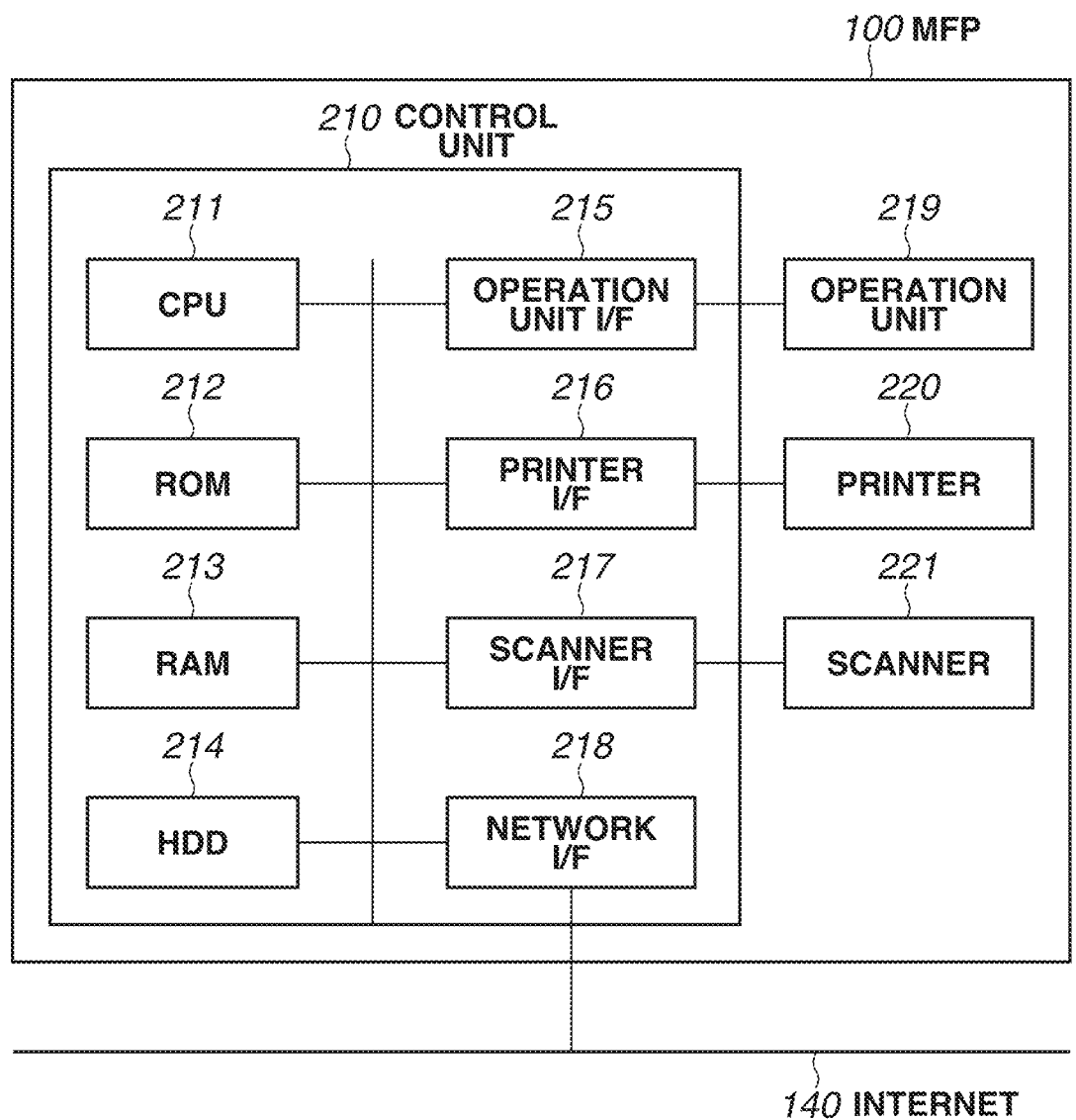
FIG. 2 is a block diagram illustrating a configuration of a multifunctional peripheral (MFP).

FIG. 2 is a diagram illustrating an example of a hardware configuration of the MFP 100.

A control unit 210 including a central processing unit (CPU) 211 comprehensively controls operations of the MFP 100. The CPU 211 executes a program stored in a read only memory (ROM) 212 or a hard disk drive (HDD) 214, thereby performing functions of the MFP 100, processing for the MFP 100 in a sequence diagram (described below), and processing relating to the MFP 100 in a flowchart (described below). Herein, one CPU 211 uses one memory (a RAM 213 or the HDD 214) to perform the functions of the MFP 100, the processing for the MFP 100 in the sequence diagram, and the processing relating to the MFP 100 in the flowchart. However, another configuration may be employed. For example, a plurality of CPUs may use a plurality of RAMs or HDDs to perform the functions of the MFP 100, the processing for the MFP 100 in the sequence diagram, and the processing relating to the MFP 100 in the flowchart.

The ROM 212 stores various programs to be executed by the CPU 211. The RAM 213 is used as a main memory and a temporary storage area such as a work area of the CPU 211. The HDD 214 stores image data and various programs. An operation unit interface (I/F) 215 connects an operation unit 219 and the control unit 210. The operation unit 219 includes a liquid crystal display unit having a touch panel function, and a keyboard.

A printer I/F 216 connects a printer 220 and the control unit 210. The control unit 210 transmits image data to be printed to the printer 220 via the printer I/F 216. The printer 220 prints the image data, which has been received from the control unit 210 via the printer I/F 216, on a recording medium.

A scanner I/F 217 connects a scanner 221 and the control unit 210. The scanner 221 reads an image on a document to generate image data (image file), and inputs the image data to the control unit 210 via the scanner I/F 217. The MFP 100 can transmit the image data (image file) generated by the scanner 221 by file transmission or email.

A network I/F 218 connects the control unit 210 to the Internet 140.

Figure 3:
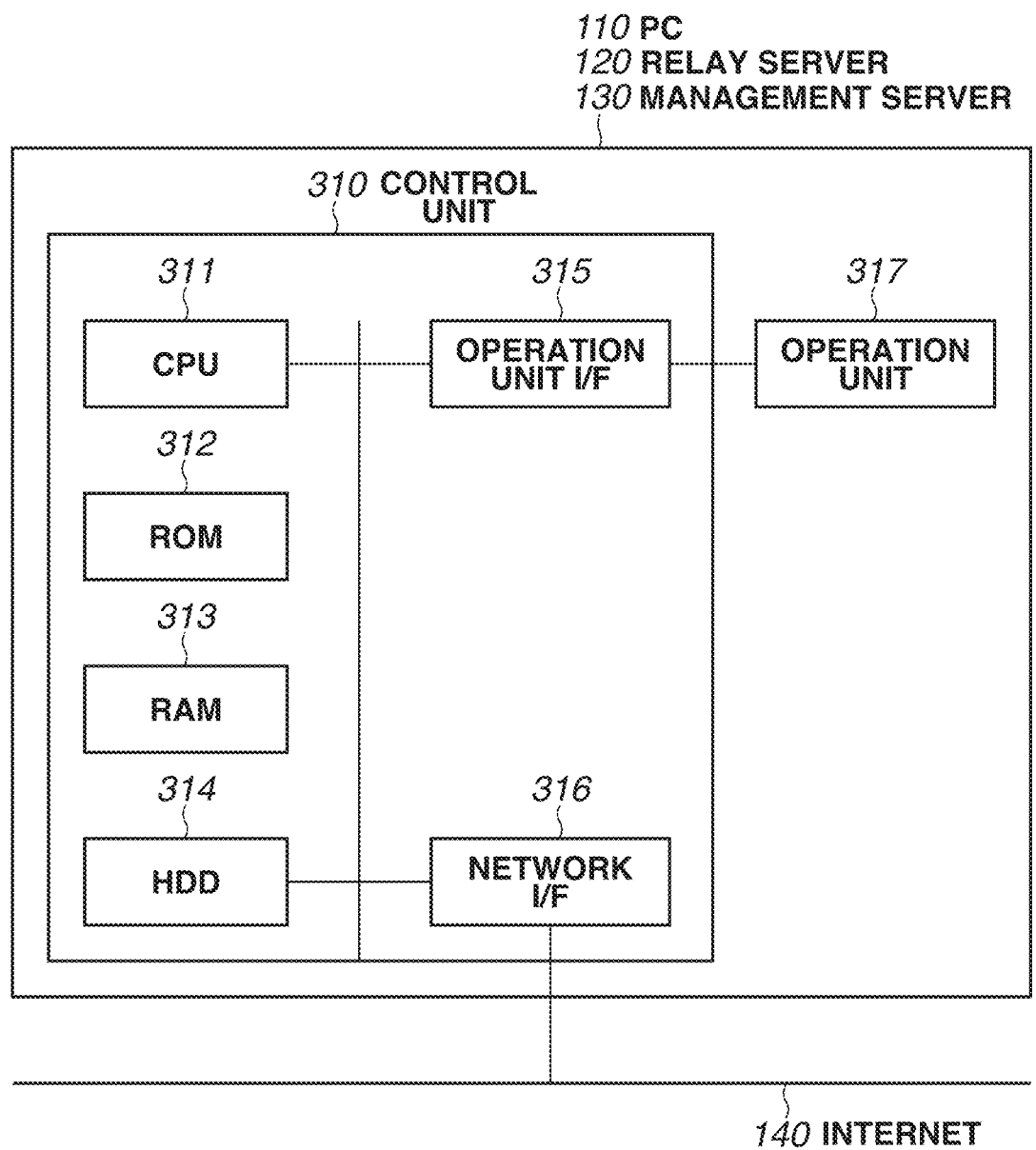
FIG. 3 is a block diagram illustrating configurations of a personal computer (PC), a relay server, and a management server.

FIG. 3 is a diagram illustrating an example of a hardware configuration of the PC 110.

A control unit 310 including a CPU 311 comprehensively controls operations of the PC 110. The CPU 311 executes a program stored in a ROM 312 or an HDD 314 to perform functions of the PC 110, processing for the PC 110 in the sequence diagram (described below), and processing relating to the PC 110 in a flowchart (described below). The ROM 312 stores various programs to be executed by the CPU 311. The RAM 313 is used as a main memory and a temporary storage area such as a work area of the CPU 311. The HDD 314 stores image data and various programs.

An operation unit I/F 315 connects an operation unit 317 and the control unit 310. The operation unit 317 includes a liquid crystal display unit having a touch panel function, a keyboard, and a mouse. A network I/F 316 connects the control unit 310 to the Internet 140.

A hardware configuration of the relay server 120 is similar to that of the PC 110. In other words, a CPU 311 of the relay server 120 executes a program stored in a ROM 312 or an HDD 314 of the relay server 120. Accordingly, the relay server 120 performs functions thereof, processing therefor in the sequence diagram (described below), and processing relating thereto in a flowchart (described below).

Figure 4:
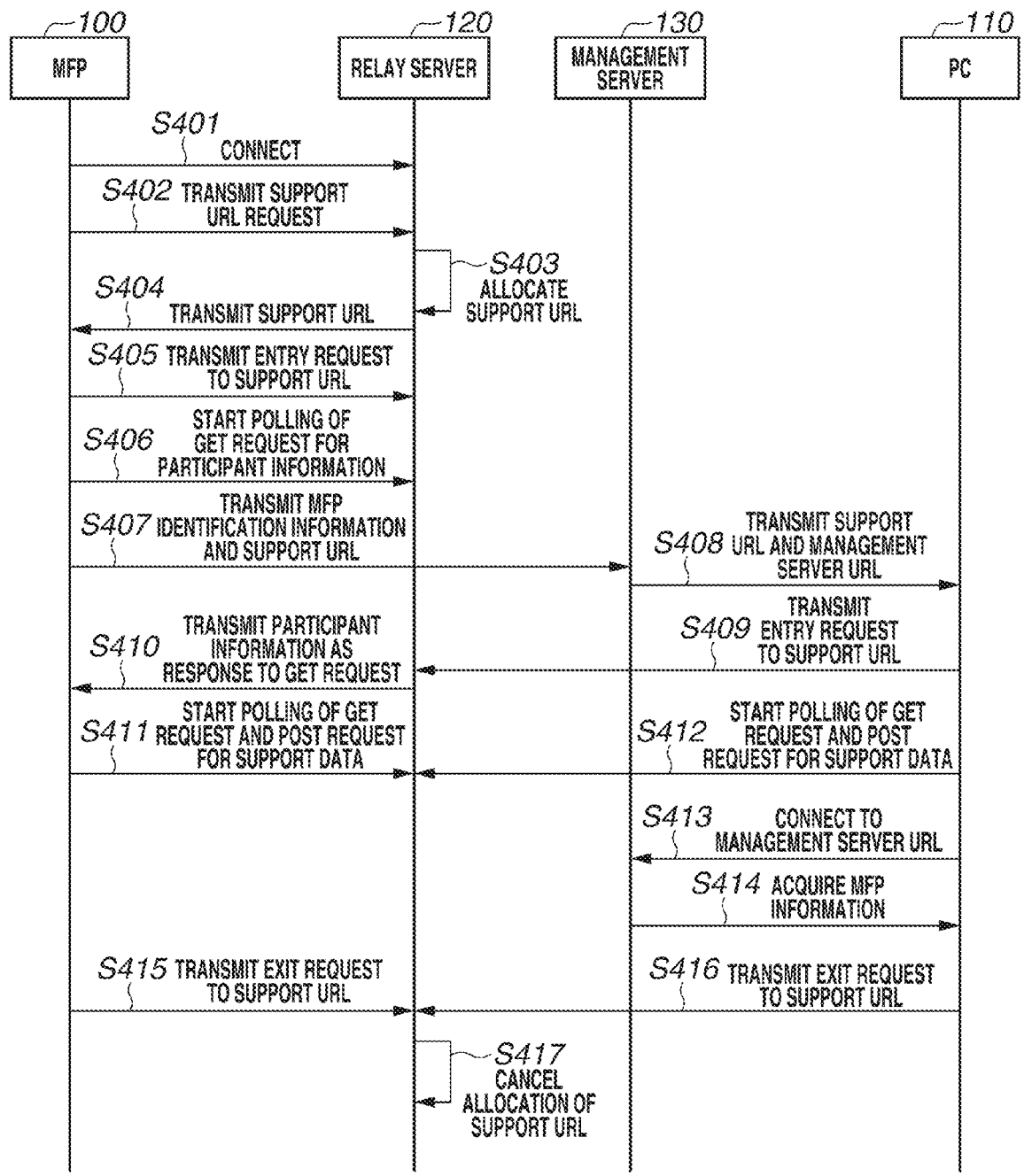
FIG. 4 is a sequence diagram illustrating an example of processing performed by the MFP, the PC, the relay server, and the management server according to a first exemplary embodiment.

FIG. 4 is a sequence diagram illustrating an example of processing performed by the MFP 100, the PC 110, the relay server 120, and the management server 130.

In step S401, when a user performs a support start operation using the operation unit 219 of the MFP 100, the MFP 100 performs connection processing to the relay server 120. More specifically, when the user inputs authentication information via the operation unit 219, the relay server 120 performs authentication using the information. When the authentication has succeeded, the MFP 100 is connected to the relay server 120. That is, the connection processing is completed. In step S402, the MFP 100 transmits a support URL request to the relay server 120. In step S403, the relay server 120 allocates a support URL according to the request from the MFP 100. In step S404, the relay server 120 transmits the allocated support URL to the MFP 100.

In step S405, the MFP 100 transmits an entry request to the support URL. Upon receipt of the entry request to the support URL, the relay server 120 buffers the information of the MFP 100 in the RAM 313 as a participant.

In step S406, the MFP 100 regularly transmits a GET request for participant information to the relay server 120. That is, the MFP 100 starts polling of a GET request for participant information. Upon receipt of the GET request for the participant information to the support URL, the relay server 120 replies to the requestor with the updated participant information buffered in the RAM 313. Moreover, upon receipt of an exit request to the support URL in step S415, the relay server 120 deletes the corresponding information from the participant information buffered in the RAM 313.

In step S407, the MFP 100 transmits the support URL allocated by the relay server 120 and identification information thereof to the management server 130. The MFP identification information is unique information in the world to identify the MFP 100.

In step S408, the management server 130 identifies the call center 112 which operates and maintains the MFP 100 based on the MFP management table 131, and transmits the support URL and a management server URL to the corresponding PC 110 by email. The use of the email enables information needed for the support to be notified to the PC 110 from the management server 130 even in the environment with the firewall 111. In the description below, the email is used for notification. However, other protocols may be used. For example, polling from the PC 110 to the management server 130 may be performed to pass the firewall 111, so that data can be acquired from the management server 130.

The management server URL is used to access the management server 130. When an external apparatus accesses the management server URL, the external apparatus can acquire information managed by the management server 130.

In step S409, upon receipt of the support URL from the management server 130, the PC 110 transmits an entry request to the support URL. In step S410, the relay server 120 buffers the information of the PC 110 as a participant in the RAM 213. Moreover, the relay server 120 transmits the participant information to the MFP 100 as a response to the GET request for participant information received in step S406 from the MFP 100. Thus, the MFP 100 can recognize that the PC 110 has been selected as an apparatus that supports the MFP 100.

In step S411, the MFP 100 regularly transmits a POST request and a GET request to the allocated support URL. Meanwhile, in step S412, the PC 110 regularly transmits a POST request and a GET request to the allocated support URL. With steps S411 and S412, the MFP 100 and the PC 110 communicate with each other to exchange the support data via the relay server 120. For example, in case of a failure such as a jam in the MFP 100, a user may not be able to restore the MFP 100 from the failure. In such a case, failure information is notified by the MFP 100 to an operator in the call center 112 to find a cause of the failure. In this case, the MFP 100 transmits a POST request for the information indicating the failure to the support URL, and the relay server 120 stores such information in the RAM 313. Then, the PC 110 in the call center 112 transmits a GET request to the support URL, and the relay server 120 transmits the information stored in the RAM 313 to the PC 110 as a response. The operator in the call center 112, who has found the cause of the failure based on the information transmitted from the MFP 100, uses a moving image to inform the user of the MFP 100 of a method for cancelling the error. In this case, the operator in the call center 112 operates the PC 110 to transmit a POST request for moving image data to the support URL, and the relay server 120 stores the moving image data to the RAM 313. Subsequently, the MFP 100 transmits a GET request to the support URL, and the moving image data stored in the RAM 313 of the relay server 120 is transmitted to the MFP 100.

As described above, the management server 130 manages various information including an error history of the MFP 100. In step S413, the PC 110 is connected to the management server URL transmitted from the management server 130 in step S408. Accordingly, in step S414, the PC 110 acquires the information of the MFP 100. Thus, when supporting the MFP 100, the operator can refer to, for example, a history of past errors.

In step S415, after the support from the operator is finished, the MFP 100 transmits an exit request to the support URL. Meanwhile, in step S416, the PC 110 transmits an exit request to the support URL. In step S417, the relay server 120 cancels the allocation of the support URL which is no longer needed.

FIG. 5 (consisting of FIGS. 5A and 5B) is a flowchart illustrating an example of processing performed by the MFP 100. Each operation (step) of the flowchart illustrated in FIG. 5 is performed by the CPU 211 of the MFP 100 executing the control program stored in the HDD 214.

In step S501, the MFP 100 detects an error therein. In step S502, the MFP 100 transmits error information to the management server 130. The MFP 100 may classify an error according to a level of importance or emergency, and transmit a message only when the error is classified as a high level.

In step S503, the MFP 100 determines whether the user has input a remote support start request from the operation unit 219. If the remote support start request has been input from the operation unit 219 (YES in step S503), the processing proceeds to step S504. In step S504, the MFP 100 performs connection processing to the relay server 120. In step S505, the MFP 100 determines whether the connection to the relay server 120 has succeeded. If the connection to the relay server 120 has succeeded (YES in step S505), the processing proceeds to step S506. In step S506, the MFP 100 transmits a support URL request to the relay server 120. Subsequently, in step S507, the MFP 100 receives the support URL allocated by the relay server 120 in response to the request.

In step S508, upon receipt of the support URL, the MFP 100 transmits an entry request to the support URL. In step S509, the MFP 100 starts polling of a GET request for participant information to the support URL.

Moreover, in step S510, the MFP 100 transmits MFP identification information and the support URL to the management server 130. If the transmission of the MFP identification information and the support URL has succeeded (YES in step S511), the processing proceeds to step S512. In step S512, the MFP 100 receives the participant information as a response to the GET request from the relay server 120. Accordingly, the MFP 100 can identify the PC 110 which supports the MFP 100.

In step S513, after identifying the PC 110 which provides the support, the MFP 100 starts polling of a POST request and a GET request for support data to the support URL via the relay server 120. More specifically, as described above, the MFP 100 transmits a POST request and a GET request for support data to the support URL, thereby receiving the support data transmitted from the PC 110 and transmitting the support data to the PC 110.

In step S514, after the support from the PC 110 is finished, the MFP 100 determines whether the user has input a support end request from the operation unit 219. If the user has input the support end request from the operation unit 219 (YES in step S514), the processing proceeds to step S515. In step S515, the MFP 100 transmits an exit request to the support URL.

If the connection to the relay server 120 has failed (NO in step S505), the processing proceeds to step S516. In step S516, the MFP 100 notifies the management server 130 of the failure of connection to the relay server 120. If the transmission of the connection failure notification to the management server 130 has succeeded (YES in step S517), the processing proceeds to step S518. In step S518, the MFP 100 displays a message on the operation unit 219, the message indicating that the call center 112 has been notified.

If the transmission of the connection failure notification to the management server 130 has failed (NO in step S517), the processing proceeds to step S519. In step S519, the MFP 100 displays a telephone number of the call center 112 and a message, such as "please call the call center", on the operation unit 219. Then, the processing ends. If the transmission to the management server 130 has failed (NO in step S511), the processing proceeds to step S520. In step S520, the MFP 100 displays the support URL, a telephone number of the call center 112, and a message for prompting the user to contact the call center 112 on the operation unit 219. Then, the processing ends.

FIG. 6 is a flowchart illustrating an example of processing performed by the PC 110. Each operation (step) of the flowchart illustrated in FIG. 6 is performed by the CPU 311 of the PC 110 executing the control program stored in the HDD 314.

In step S601, the PC 110 receives a support URL and a management server URL transmitted from the management server 130 by email. In step S602, the PC 110 displays the support URL and the management server URL on an operation unit 317. The PC 110 may display information of the received email as it is on the operation unit 317, or as an application screen.

In step S603, the PC 110 determines whether an operator has input a support URL connection instruction from the operation unit 317. If the support URL connection instruction has been input (YES in step S603), the processing proceeds to step S604. In step S604, the PC 110 transmits an entry request to the support URL.

In step S605, the PC 110 starts polling of a POST request and a GET request for support data to the support URL via the relay server 120. More specifically, as described above, the PC 110 transmits a POST request and a GET request for support data to the support URL, thereby receiving the support data transmitted from the MFP 100 and transmitting the support data to the MFP 100. Therefore, the operator can support the user of the MFP 100 by using audio, moving image communication, or remote control.

In step S606, the PC 110 determines whether a connection instruction to the management server URL has been input from the operation unit 317. If the management server URL connection instruction has been input from the operation unit 317 (YES in step S606), the processing proceeds to step S607. In step S607, the PC 110 transmits an MFP information request to the management server URL. In step S608, the PC 110 receives the MFP information transmitted from the management server 130 in response to the request. In step S609, the PC 110 displays the MFP information on the operation unit 317. Accordingly, when supporting the MFP 100, the operator can refer to, for example, a history of past errors.

In step S610, after the support of the MFP 100 is finished, the PC 110 determines whether a support end request has been input from the operation unit 317. If the support end request has been input from the operation unit 317 (YES in step S610), the processing proceeds to step S611. In step S611, the PC 110 transmits an exit request to the support URL.

FIG. 7 is a flowchart illustrating an example of processing performed by the relay server 120. Each operation (step) of the flowchart illustrated in FIG. 7 is performed by the CPU 311 of the relay server 120 executing the control program stored in the HDD 314.

In step S701, the relay server 120 determines whether a connection request has been received from the MFP 100. In step S702, after being connected to the MFP 100, the relay server 120 receives a support URL request from the MFP 100. In step S703, the relay server 120 allocates a support URL. Among a plurality of predetermined URLs, the relay server 120 may allocate a URL that is not currently used as a support URL. Alternatively, the relay server 120 may newly generate a support URL in response to the request from the MFP 100.

In step S704, the relay server 120 transmits the allocated support URL to the MFP 100. Subsequently, in step S705, the relay server 120 receives an entry request to the support URL from the MFP 100. In step S706, the relay server 120 receives a GET request for participant information from the MFP 100. In step S707, the relay server 120 receives an entry request to the support URL from the PC 110. Then in step S708, the relay server 120 transmits the participant information to the MFP 100 as a response to the GET request. This enables support data to be transmitted and received between the MFP 100 and the PC 110 via the relay server 120.

If the relay server 120 has received a POST request for the support data from the MFP 100 or the PC 110 (YES in step S709), the processing proceeds to step S710. In step S710, the relay server 120 stores the support data in the RAM 313. If the relay server 120 has received a GET request for the support data from the MFP 100 or the PC 110 (YES in step S711), the processing proceeds to step S712. In step S712, the relay server 120 transmits the support data stored in the RAM 313 to the requestor. This enables the support data to be transmitted and received between the MFP 100 and the PC 110, so that the operator can support the user with such data. After the support is finished, the relay server 120 determines whether exit requests to the support URL has been received from the MFP 100 and the PC 110. If the exit requests to the support URL have been received from the MFP 100 and the PC 110 (YES in step S713), the processing proceeds to step S714. In step S714, the relay server 120 cancels the allocation of the support URL.

FIG. 8 is a flowchart illustrating an example of processing performed by the management server 130. Each operation (step) of the flowchart illustrated in FIG. 8 is performed by the CPU 311 of the management server 130 executing the control program stored in the HDD 314.

In step S801, the management server 130 determines whether MFP identification information and a support URL have been received from the MFP 100. If the MFP information and the support URL have been received (YES in step S801), the processing proceeds to step S802. In step S802, the management server 130 identifies the PC 110 in the call center 112 corresponding to the MFP 100 based on the MFP management table 131, and transmits the support URL and a management server URL to the PC 110.

Figure 9:
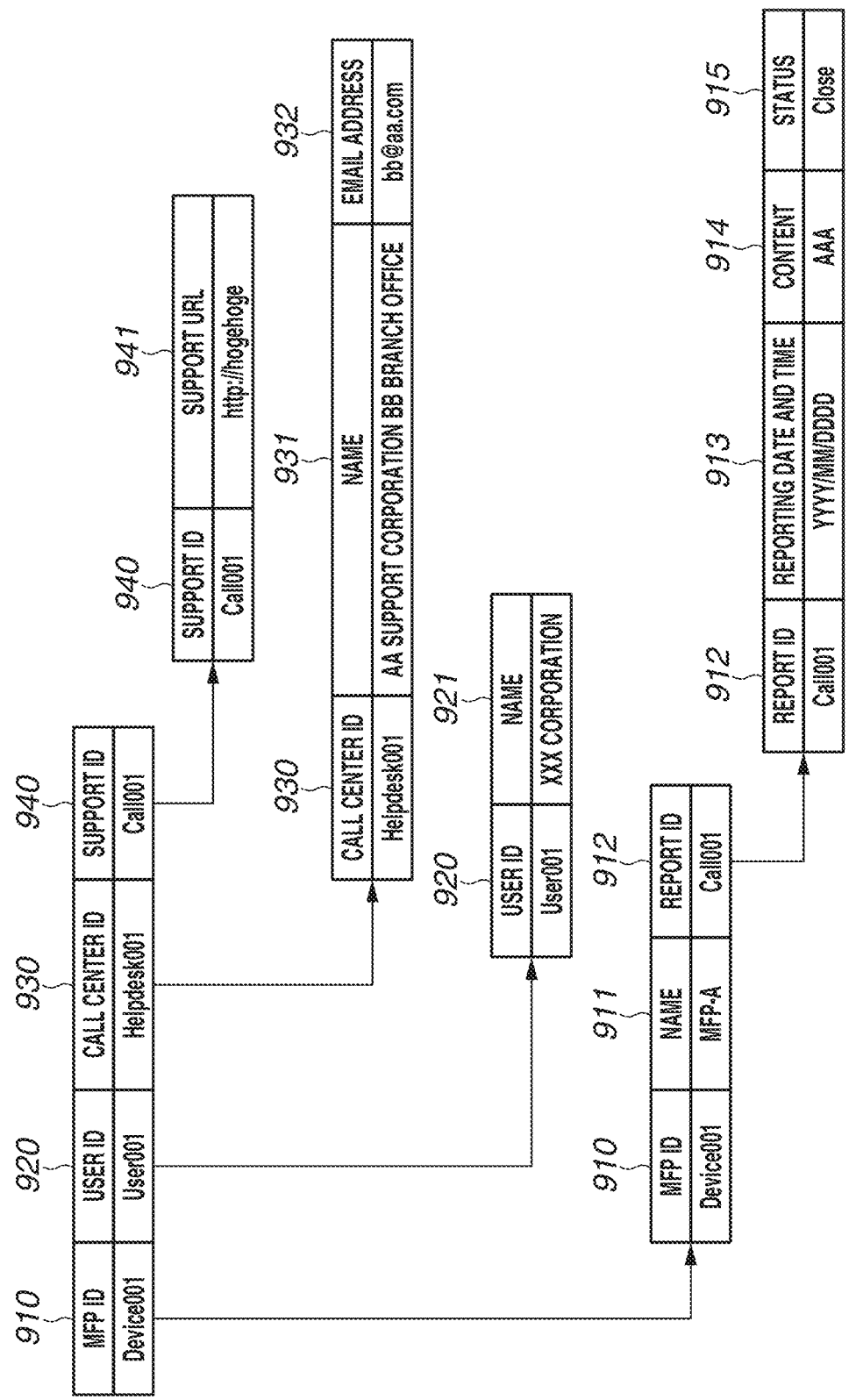
FIG. 9 is a diagram illustrating an MFP management table.

FIG. 9 is a detailed diagram illustrating the MFP management table 131 stored in the HDD 314 of the management server 130. The MFP management table 131 includes MFP identification (ID) 910, user (customer) ID 920, call center ID 930, and support ID 940. The MFP ID 910 is identification information so that each of the MFPs 100 is uniquely identified. The MFP ID 910 corresponds to the MFP identification information transmitted from the MFP 100 to the management server in step S407 of the sequence diagram illustrated in FIG. 4. A name 911 indicates information about a product name of the MFP 100. Report ID 912 is information which identifies a past report on the MFP 100. A plurality of report ID 912 may be provided depending on the number of reports. Reporting date and time 913 is information about a date and time on which the report is given. A content 914 is information about a content of the report. A status 915 is information about a status of the report. The information 912 through 915 corresponds to the MFP information transmitted to the PC 110 from the management server 130 in step S414 of the sequence diagram illustrated in FIG. 4.

The user ID 920 is information used to identify a user of the MFP 100. A name 921 is information about a name of the user.

The call center ID 930 is information used to identify a call center that operates and maintains the MFP 100. A name 931 indicates a name of the call center, whereas an email address 932 is information about an email address of the call center. The email address 932 is used as a transmission destination of the email described in step S408 of the sequence diagram illustrated in FIG. 4.

The support ID 940 is information used to identify a support operation. In step S407 of the sequence diagram illustrated in FIG. 4, the support ID 940 is updated when the MFP identification information and the support URL are transmitted from the MFP 100 to the management server 130. A support URL 941 is information about a support URL.

Accordingly, the management server 130 manages the MFP 100, the user using the MFP 100, and the call center 112 operating and maintaining the MFP 100 by associating them with one another. Thus, even if a user issues a support start instruction from any of the MFP 100s, information (e.g., support URL) needed for the support can be notified to an appropriate call center as long as the MFPs 100 are under the management of the management server 130.

The description goes back to FIG. 8. In step S803, the management server 130 determines whether an MFP information request to the management server URL has been received from the PC 110. If the MFP information request has been received (YES in step S803), the processing proceeds to step S804. In step S804, the management server 130 transmits the MFP information to the PC 110.

Therefore, according to the present exemplary embodiment, the MFP 100 notifies the management server 130 of the support URL allocated by the relay server 120, whereas the management server 130 notifies the PC 110 on the appropriate call center 112 side of the allocated support URL. Thus, if the user of the MFP 100 issues only a support start instruction, the PC 110 and the MFP 100 can communicate with each other via the relay server 120. This enables the user of the MFP 100 to receive remote support service.

The MFP 100 keeps producing a dial tone for a time period from when the remote support service start request is received from the user in step S503 of the flowchart illustrated in FIG. 5 until when the support is started by the PC 110 in step S513. For example, a time period from when the PC 110 receives the support URL until when the operator performs the connection start operation may be prolonged. In such a case, the dial tone continues during the time period. This may cause the user to feel that the waiting time is long.

Accordingly, in step S503 in FIG. 5, the MFP 100 determines whether a remote support start request has been input from the operation unit 219. If the remote support start request has been input from the operation unit 219 (YES in step S503), the processing from steps S504 to S512 is executed. In step S512, the MFP 100 receives the participant information from the relay server 120. Subsequently, the MFP 100 may switch a display of the operation unit 219 when the PC 110 serving as a supporter is determined, and may start support data communication when a support start instruction is received from the user.

Next, a second exemplary embodiment of the present invention will be described. In the first exemplary embodiment, all the MFPs 100 are managed by the management server 130 while receiving monitoring services from the management server 130. However, all of the MFPs 100 may not always be receiving the monitoring services performed from the management server 130. The present exemplary embodiment is described using a method by which a support URL can be notified to a PC 110 even when an MFP 100 is not receiving monitoring service from a management server 130.

FIGS. 10A and 10B are examples of setting screens of the MFP 100. A service person usually displays screens 1001 and 1011 to set service settings when installing the MFP 100. In general, a user of the MFP 100 does not display or operate these screens 1001 and 1011.

Figure 11A:
FIGS. 11A and 11B are diagrams each illustrating an example of a support request screen of the MFP according to the second exemplary embodiment.

The screen 1001 illustrated in FIG. 10A is a screen to set a service setting to receive support from a remote operator. An input item 1002 is used to enable a remote support service function from the operator. If the item 1002 is enabled, the user of the MFP 100 can receive the remote support service from the operator. While the item 1002 is enabled, a support request screen as illustrated in FIG. 11A is displayed on a user screen of the MFP 100. An item 1003 is used to set a transmission control protocol (TCP) port number that is used for connection to a relay server 120. An item 1004 indicates a connection URL for connecting to the relay server 120. The service person sets the connection URL of the relay server 120 when installing the MFP 100, for example. When the MFP 100 is connected to the relay server 120 using the connection URL, the MFP 100 receives a support URL from the relay server 120 by the method described above. An item 1005 is used to instruct the relay server 120 to execute a communication test. When the MFP 100 is installed, the service person uses the communication test function of the item 1005 to check whether the support service function from the remote operator functions effectively. An item 1006 is a button to be pressed to check a communication log. When the button of the item 1006 is pressed, communication records including a record of the communication test with the relay server 120 can be checked. An item 1007 indicates an email address serving as a transmission destination to which a support URL is to be transmitted. An email address of the call center 112 is normally set in the item 1007. When the user issues a support start instruction on the support request screen illustrated in FIG. 11A, the MFP 100 is connected to the relay server 120 to transmit information of a support URL allocated by the relay server 120 to the set email address.

The screen 1011 is a screen to set monitoring services to be performed by the management server 130. An input item 1012 is used to enable a monitoring service function. If the item 1012 is enabled, the MFP 100 can receive the monitoring service from the management server 130 in a remote location. Thus, the MFP 100 can regularly transmit, for example, information about a counter and firmware to the management server 130. Moreover, the MFP 100 can irregularly transmit event information such as a service call error and a jam to the management server 130. An item 1013 is used to set a TCP port number that is used when the MFP 100 is connected to the management server 130. An item 1014 indicates a transmission destination URL to which monitoring information of the management server 130 is transmitted. In a case where this URL needs to be changed, the service person can make a change in the item 1014. Items 1015 and 1016 respectively provide a communication test function and a communication log function to the management server 130, as similar to the items 1005 and 1006.

The processing described in the first exemplary embodiment can be performed by enabling the support service function to be performed by the remote operator and the monitoring service function from the setting screens 1001 and 1011. On the other hand, in a case where the user does not receive the monitoring service, the MFP 100 does not communicate with the management server 130. Consequently, the above-described method cannot be used. Even in such a case, the email address of the operator in the item 1007 is used to notify the PC 110 of the support URL.

If the monitoring service function is disabled from the setting screen 1011, the support URL is not notified via the management server 130. In this case, the email address of the operator in the item 1007 is necessary. On the other hand, if the monitoring service function is enabled, the support URL is notified via the management server 130. Thus, the email address of the operator in the item 1007 is not necessary. Therefore, when the monitoring service function is enabled, the item 1007 may be controlled such that an email address of the operator cannot be input.

FIG. 11A is an example of a support request screen displayed to receive a remote support service start request from the user. When the remote support service function is enabled by using the input item 1002, the screen illustrated in FIG. 11A can be displayed as one of user screens. When the user presses an "ISSUE SUPPORT REQUEST" button on the screen illustrated in FIG. 11A, the MFP 100 is connected to the relay server 120 to acquire the support URL from the relay server 120. The MFP 100 transmits the acquired support URL to the PC 110 which is operated by the operator in the call center 112.

Figure 11B:

However, the user may use the MFP 100 for a long time. In such a case, the email address of the operator, which is set on the setting screen for the remote support service function, may not be used any more. Therefore, the support URL cannot be notified to the operator unless the email address is updated properly. Moreover, a user may intend to receive remote support from a specific person. For example, while working on maintenance of the MFP 100, a service person may need support from a high-skilled engineer in a remote location or may need to ask a simple question to an in-house MFP operator. The screen illustrated in FIG. 11A includes an input item of "DESIGNATED NOTIFICATION DESTINATION" to optionally designate a notification destination of the support URL for such a situation. When an email address of a partner who provides the support is input to the "DESIGNATED NOTIFICATION DESTINATION" input item, the support URL is notified to the designated email address. Alternatively, when an icon in this input item is pressed, a notification destination may be selected from an address book managed inside the MFP 100. FIG. 11B illustrates an example of the screen on which an email address is input in the "DESIGNATED NOTIFICATION DESTINATION" item.

FIG. 12 is a diagram illustrating an example of a screen that displays a support URL on a user screen of the MFP 100. As described above, when the MFP 100 receives a support URL from the relay server 120, the support URL is transmitted to the set email address as a destination. However, a failure may occur in an intermediate mail transfer agent (MTA), or email transmission may be delayed. In such a case, the operator cannot receive the support URL. Consequently, the PC 110 cannot be connected to the relay server 120. In preparation for such a case, the user needs to be able to check the support URL, which has been allocated by the relay server 120, on the screen. With the preparation, even if an email is not delivered to the operator, the support URL may be informed by telephone, for example. This enables the MFP 100 and the PC 110 to communicate with each other via the relay server 120. Alternately, telephone number of the call center and a message for prompting a user to contact the phone number may be displayed together with the support URL.

Figure 13B:
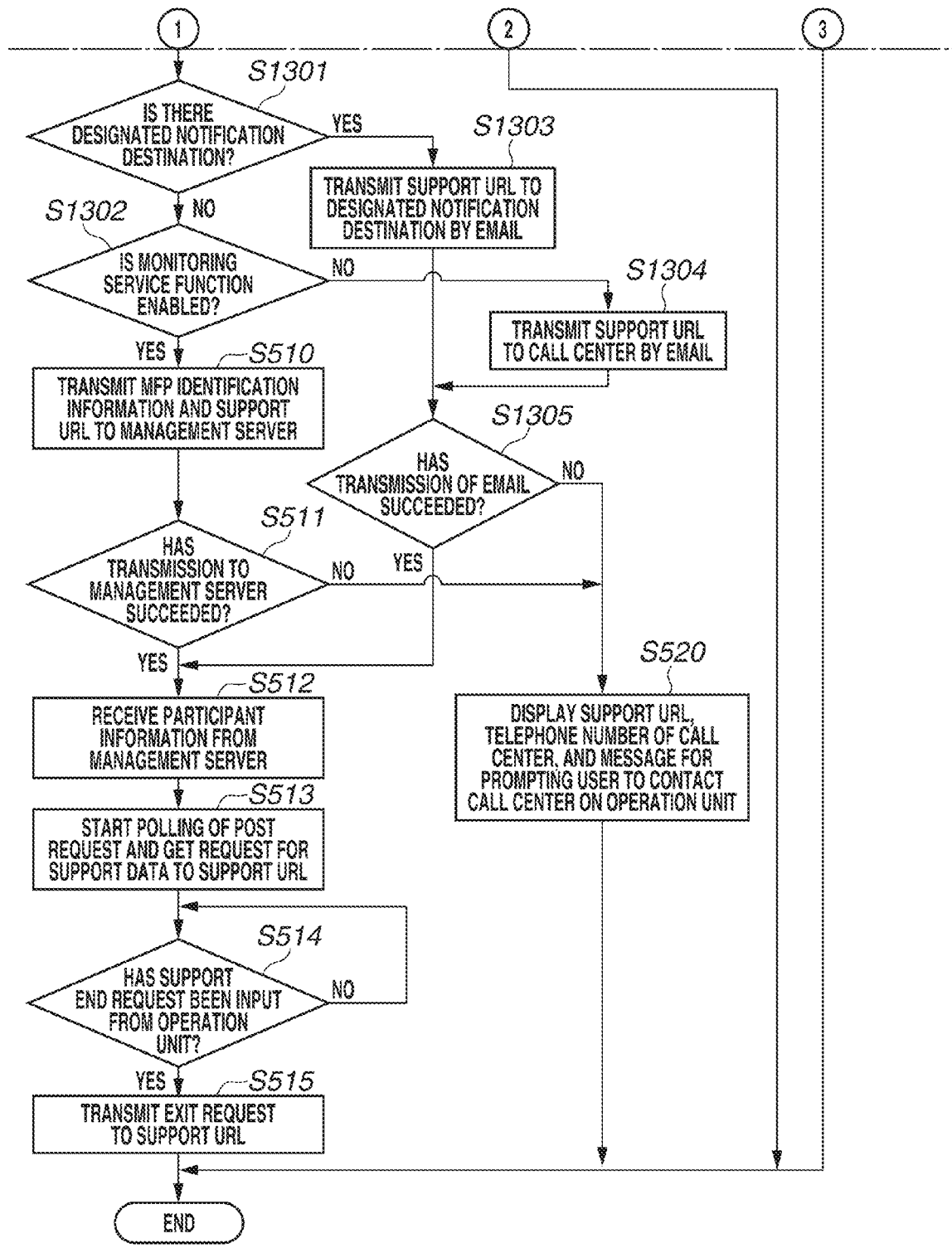
FIG. 13 (consisting of FIGS. 13A and 13B) is a flowchart illustrating an example of processing performed by the MFP according to the second exemplary embodiment.

FIG. 13 (consisting of FIGS. 13A and 13B) is a flowchart illustrating an example of processing performed by the MFP 100. The same step numbers are given for the processing which is substantially the same as that illustrated in FIG. 5, and description thereof is omitted.

After step S509, the processing proceeds to step S1301 in which the MFP 100 determines whether there is a designated notification destination on the screen illustrated in FIG. 11A or 11B. If there is a designated notification destination (YES in step S1301), then in step S1303, the MFP 100 transmits the support URL to the designated notification destination by email. If there is no designated notification destination (NO in step S1301), then in step S1302, the MFP 100 determines whether a monitoring service function is enabled. In other words, the MFP 100 determines whether the item 1012 on the screen illustrated in FIG. 10B is enabled. If the monitoring service function is not enabled (NO in step S1302), the processing proceeds to step S1304. In step S1304, the MFP 100 transmits the support URL by email to the email address of the call center 112, which has been set in the item 1007 on the screen illustrated in FIG. 11A, as a destination. If the monitoring service function is enabled (YES in step S1302), the processing proceeds to step S510 and then the processing of steps S510 through S520 described above in the first exemplary embodiment is performed.

In step S1305, after transmitting the support URL to the designated notification destination or the call center 112 by email, the MFP 100 checks whether the transmission of email has succeeded. If the email transmission has succeeded (YES in step S1305), the processing in step S512 and subsequent steps is performed. If the email transmission has failed (NO in step S1305), the processing proceeds to step S520. In step S520, the MFP 100 displays the support URL on the operation unit 219 as illustrated in FIG. 12 to prompt the user to contact the call center 112.

According to the present exemplary embodiment, even if the MFP 100 does not receive the monitoring service function from the management server 130, the MFP 100 can receive remote support service from the PC 110 in the call center 112. Therefore, the user of the MFP 100 only has to perform the remote support service start operation to receive the remote support service without the need to consider whether the MFP 100 is under the management of the management server 130.

Moreover, the user can designate an email address of a desired partner to receive remote support service from the partner. This enhances usability for the user.

Next, a third exemplary embodiment is described. In the first exemplary embodiment, the management server 130 transmits the support URL to the PC 110 in the call center 112 by email. The present exemplary embodiment is described using an example case in which a PC 110 regularly transmits an inquiry (performs polling) to a management server 130 to acquire a support URL. In this case, the shorter the polling cycle, the greater the load of the management server 130. Moreover, the longer the polling cycle, the longer the time needed for the PC 110 to acquire the support URL. This causes a user to wait for a longer time. In the present exemplary embodiment, the polling cycle is shortened at specific timing, thereby reducing a load of the management server 130 and preventing the user from waiting for a longer time.

FIG. 14 is a sequence diagram illustrating an example of processing performed by an MFP 100, the PC 110, a relay server 120, and the management server 130 according to the present exemplary embodiment.

In step S1401, the MFP 100 detects an error. In step S1402, the MFP 100 notifies the management server 130 of error information indicating that the error has occurred and a content of the error. The MFP 100 may classify the error according to a level of importance or emergency, and transmit a message only when the error is classified as a high level.

In step S1403, upon receipt of the error notification from the MFP 100, the management server 130 transmits the error information to the PC 110. In step S1404, upon receipt of the error information, the PC 110 shortens a polling cycle for the management server 130 to a cycle shorter than a normal cycle. Since processing in steps S1405 through S1411 is similar to that in steps S401 through S407 of the sequence diagram t illustrated in FIG. 4, description thereof is omitted.

In step S1411, the management server 130 receives the support URL from the MFP 100. In step S1412, the management server 130 transmits the support URL and the management server URL to the PC 110 as a response to the inquiry from the PC 110. In step S1413, upon receipt of the support URL and the management server URL from the management server 130, the PC 110 returns the polling cycle to the normal cycle. Since the processing performed after step S1414 is similar to that performed after step S409 of the sequence diagram illustrated in FIG. 4, description thereof is omitted.

FIG. 15 is a flowchart illustrating an example of processing performed by the PC 110 according to the third exemplary embodiment.

The PC 110 regularly transmits an inquiry (performs polling) about a support URL to the management server 130. In step S1501, the PC 110 acquires error information of the MFP 100 from the management server 130. In step S1502, the PC 110 shortens a polling cycle for the management server 130. Subsequently, in step S1503, the PC 110 receives a support URL and a management server URL from the management server 130. Then in step S1504, the PC 110 returns the polling cycle for the management server 130 to the normal cycle. Since the processing in step S1505 through step S1515 is similar to that in steps S601 through S611 of the flowchart illustrated in FIG. 6, description thereof is omitted.

FIG. 16 is a flowchart illustrating an example of processing performed by the management server 130 according to the present exemplary embodiment.

In step S1601, the management server 130 receives error information from the MFP 100. In step S1602, the management server 130 transmits the error information to the PC 110. Subsequently, if the management server 130 has received MFP identification information and a support URL from the MFP 100 (YES in step S1603), the processing proceeds to step S1604. In step S1604, the management server 130 transmits the support URL and a management server URL to the PC 110 as a response to the inquiry from the PC 110. Since processing in steps S1605 and S1606 is similar to that in steps S803 and S804 of the flowchart illustrated in FIG. 8, description thereof is omitted.

In the above description, the PC 110 changes a polling cycle for the management server 130 when an error occurs in the MFP 100. However, the polling cycle may be changed at different timing. For example, the polling cycle may be changed when a user logs in to the MFP 100. In such a case, the MFP 100 notifies the management server 130 that the user has logged in, and the management server 130 transfers the notification to the PC 110. Alternatively, when the support request screen (e.g., FIG. 11A or 11B) is displayed on the MFP 100, the PC 110 may be notified accordingly via the management server 130. In such a case, the PC 110 may shorten the polling cycle upon receipt of the notification.

According to the present exemplary embodiment, therefore, the polling cycle of the PC 110 is shortened at the time when the user is more likely to perform a remote support service start operation. This can reduce a load of the management server 130 while preventing the user from waiting for a longer time even if the polling is used.

According to each of the above exemplary embodiments, the MFP 100 and the PC 110 can readily share the support URL needed for communication via the relay server 120 by using the management server 130 which manages the MFP 100 and the PC 110 by associating with each other. Thus, if the user of the MFP 100 issues only a remote service start request as necessary, the MFP 100 becomes communicable with the PC 110 in the call center 112 which manages the MFP 100. This enables the user of the MFP 100 to receive remote support.

Each of the above exemplary embodiments has been described using a case where the MFP 100 including a scanner function and a print function is remotely supported. However, each of the exemplary embodiments of the present invention may be applied to an image processing apparatus including only one of the scanner and print functions. Moreover, each of the exemplary embodiments of the present invention may be applied to other information processing apparatuses such as a facsimile machine, a camera, a video camera, and an image viewer.

Moreover, aspects of the present invention can be achieved by the following processing. More specifically, software (program) for performing the functions of the above-described embodiments is supplied to a system or an apparatus via a network or various storage media, and then a computer (or CPU or microprocessor unit (MPU)) of such a system or apparatus reads a program code to execute the functions. In such a case, the aspect of the present invention includes the computer program and a storage medium storing the computer program.

According to the above exemplary embodiments of the present invention, a user of the image forming apparatus issues a remote support service start request, so that the image forming apparatus and an appropriate information processing apparatus can communicate with each other via an relay server.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-087466 filed Apr. 21, 2014, which is hereby incorporated by reference herein in its entirety.

What is claimed is:

1. A communication system comprising:
    an image processing apparatus;
    a supporting apparatus capable of providing remote support to the image processing apparatus; and
    a management server configured to associate the image processing apparatus with the supporting apparatus for providing the remote support to the image processing apparatus to manage the image processing apparatus and the supporting apparatus,
    wherein the image processing apparatus includes:
        a receiving unit configured to receive a remote support service start request from a user;
        a request unit configured to, if the remote support service start request is received by the receiving unit, request a relay server to allocate relay information for communication via the relay server; and
        a first notification unit configured to notify the management server of the relay information allocated by the relay server in response to the request from the request unit,
    wherein the management server includes a second notification unit configured to notify the supporting apparatus managed in association with the image processing apparatus of the relay information notified by the first notification unit, and wherein the image processing apparatus and the supporting apparatus communicate with each other via the relay server by using the relay information, so that the supporting apparatus provides remote support to the image processing apparatus.

2. The communication system according to claim 1, wherein the second notification unit is configured to notify the supporting apparatus of the relay information and information for accessing information about the image processing apparatus managed by the management server, and wherein the supporting apparatus includes an acquisition unit configured to acquire the information about the image processing apparatus based on the relay information and the information for accessing information about the image processing apparatus notified by the management server.

3. The communication system according to claim 1, wherein the image processing apparatus includes a determination unit configured to determine whether monitoring service is being received from the management server, and wherein the first notification unit is configured to notify the management server of the relay information if the determination unit determines that the monitoring service is being received, whereas the first notification unit is configured to notify the supporting apparatus of the relay information if the determination unit determines that the monitoring service is not being received.

4. The communication system according to claim 3, further comprising a designation unit configured to designate a predetermined notification destination, wherein, if the predetermined notification destination is designated by the designation unit, the first notification unit is configured to notify the designated notification destination of the relay information regardless of whether the monitoring service is being received.

5. The communication system according to claim 1, wherein the second notification unit is configured to notify the relay information by electronic mail.

6. The communication system according to claim 1, wherein the second notification unit is configured to notify the relay information as a response to a regular inquiry from the supporting apparatus.

7. The communication system according to claim 1, wherein the relay information is a uniform resource locator (URL) designated when a request using a hypertext transfer protocol (HTTP) is transmitted.

8. The communication system according to claim 7, wherein, if an HTTP GET request including the designated URL is received, the relay server is configured to store data included in the GET request, and wherein, if an HTTP POST request including the designated URL is received, the relay server is configured to transmit the stored data to a requestor.

9. An image processing apparatus capable of receiving remote support from a supporting apparatus, the image processing apparatus comprising:

a receiving unit configured to receive a remote support service start request from a user;

a request unit configured to, if the remote support service start request is received by the receiving unit, request a relay server to allocate relay information for communication via the relay server;

a notification unit configured to notify a management server managing information about the image processing apparatus of the relay information allocated by the relay server in response to the request from the request unit; and a communication unit configured to communicate with the supporting apparatus via the relay server by using the relay information, the supporting apparatus having been notified of the relay information by the management server, so that the image processing apparatus is provided with remote support by the supporting apparatus.

10. A control method for an image processing apparatus capable of receiving remote support from a supporting apparatus, the control method comprising:

requesting a relay server to allocate relay information for communication via the relay server if a remote support service start request is received from a user;

notifying a management server managing information about the image processing apparatus of the relay information allocated by the relay server in response to the request; and communicating with the supporting apparatus via the relay server by using the relay information, the supporting apparatus having been notified of the relay information by the management server, so that the image processing apparatus is provided with remote support by the supporting apparatus.

\* \* \* \* \*